Figure 1:
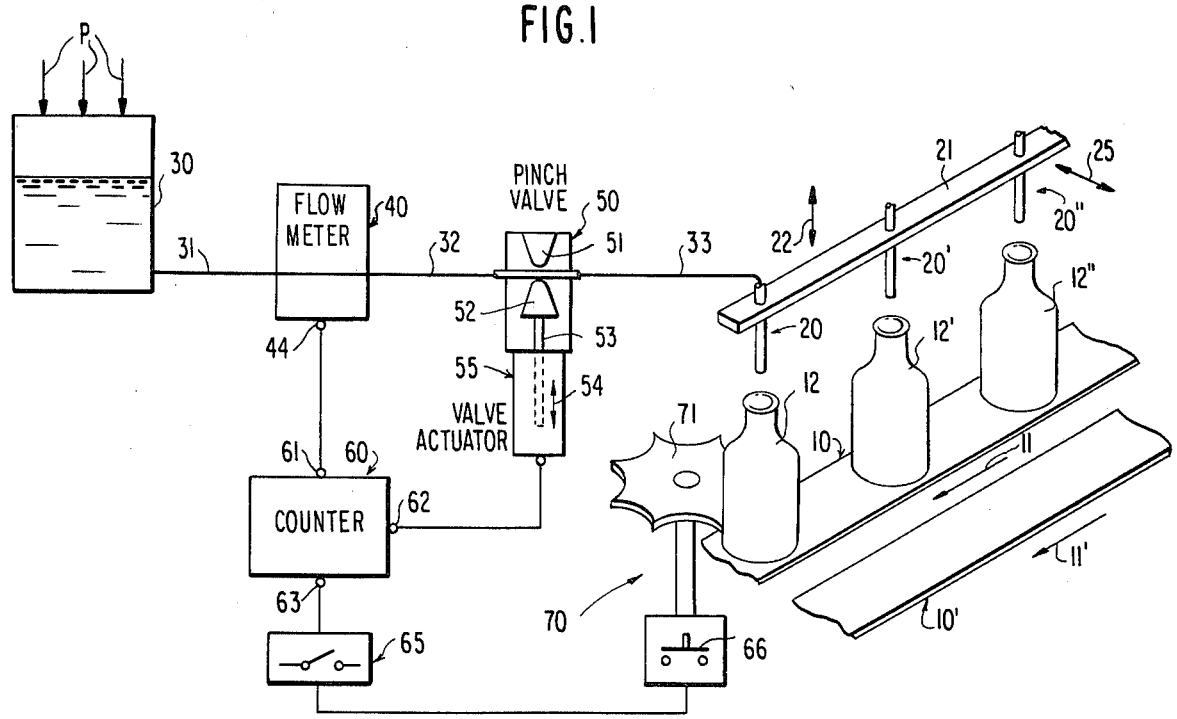

United States Patent [19]

Rosen et al.

[11] 4,401,141

[45] Aug. 30, 1983

[54] FILLING MACHINE

[75] Inventors: Robert Rosen, Owings Mills; Wieslaw Bergandy, Arnold, both of Md.

[73] Assignee: National Instrument Company, Inc., Baltimore, Md.

[21] Appl. No.: 301,054

[22] Filed: Sep. 10, 1981

[51] Int. Cl.³ .............................................. B65B 57/14
[52] U.S. Cl. .................................. 141/192; 141/180; 222/14
[58] Field of Search ............ 141/180, 192, 83, 94–96, 141/311 R, 392; 222/14–16, 23, 214

[56] References Cited

U.S. PATENT DOCUMENTS 3,812,890  5/1974  Haas ................................. 141/192 X
4,073,322  2/1978  Bennett .......................... 141/180 X
4,294,294  10/1981 Bennett .......................... 141/180 X Primary Examiner—Frederick R. Schmidt
Attorney, Agent, or Firm—Craig & Burns

[57] ABSTRACT

A filling machine for filling containers with an accurately predetermined amount of a fluid product in which a flow meter for accurately measuring the flow rate of a fluid product fed to a filling nozzle is provided in the feed line leading to such nozzle which generates signals in its output indicative of the amount of flow; the signals are counted in a counter which causes the feed line to be shut off when a predetermined programmed number of pulses has been reached. The counter is reset automatically by an indexing device which indicates that the filled container has left the filling position and a new container has arrived in the filling position; resetting of the counter causes the vavle to reopen, thereby restarting the filling operation.

14 Claims, 2 Drawing Figures

FILLING MACHINE

The present invention relates to a filling machine for accurately filling containers with predetermined amounts of fluid product.

In the past, filling machines for filling containers with a predetermined amount of fluid product generally utilized positive displacement units of the type described in the prior U.S. Pat. Nos. 2,807,213; 2,907,614 and 2,978,149. A separate filling unit was thereby associated with each nozzle so that, for example, eight such positive displacement units were used in an eight-nozzle machine. These prior art filling machines proved highly successful for most purposes. However, they entailed certain drawbacks in special applications such as with dairy products or pharmaceutical products requiring completely sanitary conditions. To achieve these sanitary conditions, it was necessary heretofore, for purposes of cleaning the parts, to completely disassemble the filling units and parts associated therewith, which frequently proved time-consuming and costly. Hence, filling machines have been proposed heretofore which operate according to the so-called constant pressure-time principle. In these prior art machines, the dispensed amount of fluid product was determined solely by the length of time a valve remained open since with a constant feed pressure of the fluid product, the amount was directly proportional to time. However, these prior proposals did not provide a practical solution to the problem since it proved difficult and costly to maintain the pressure sufficiently constant to eliminate completely even minor fluctuations in pressure adversely affecting the accuracy of the dispensed amount of fluid product, which would be unacceptable in the pharmaceutical industry. In operation, use of the pressure head of the fluid product in the supply reservoir for such filling machines changes with the amount of fluid product present in the reservoir, and thus must be compensated for if the pressure is to be maintained constant. Hence, these prior art filling machines proved of little success due to the difficulties in maintaining a constant pressure while the costs connected with attempting to achieve such constant pressure proved excessive. Further, the fill volume dispensed on time/-pressure machines is affected by changes in viscosity (or temperature) of the product.

In all of the prior art filling machines so far discussed, the filling nozzles were normally lowered into the necks of the containers prior to the filling operation and were raised out of the containers before the filled containers were released. However, since the fluid product was fed under pressure in these prior art machines, there was no need to seal the opening of the container necks during the filling operation, whence continuously operating conveyors could also be used normally in these prior art filling machines, as contrasted with so-called vacuum filling machines. In these vacuum filling machines, the fluid product is sucked into the hermetically sealed containers to the level of the extension of the open ends of the nozzles into the containers. Since these vacuum filling machines thus required a hermetic seal for each container neck during the filling operation, these prior art types of filling machines also normally required stoppage of the conveyors during the filling operation in order to minimize the danger of breaking the vacuum seal. This, in turn, complicated the mechanisms, apart from the fact that the amount of fluid product filled into the respective container depended directly on the depth of immersion of the nozzle into the container which is always fraught with certain inaccuracies.

The present invention is concerned with the task to provide a filling machine, and more particularly a high-speed filling machine, which avoids the aforementioned shortcomings and drawbacks encountered with the prior art filling machines, yet is simple in construction, reliable in operation and avoids the need for disassembly of parts, particularly of complicated mechanical assemblies for purposes of cleaning.

The underlying problems are solved in accordance with the present invention in that the amount flowing through the nozzles is accurately metered by a liquid-flow measuring device which produces signals, counted in a counter, that causes a valve to close the line leading to the nozzle when the predetermined amount as determined by the flow meter has passed therethrough. An indexing mechanism which according to another feature of the present invention may be in the form of a container-driven star wheel, will reactivate the system when the filled containers have left the filling machine and a corresponding number of empty containers have arrived at the filling station, whereby reactivating of the system will cause reopening of the valve.

Figure 2:
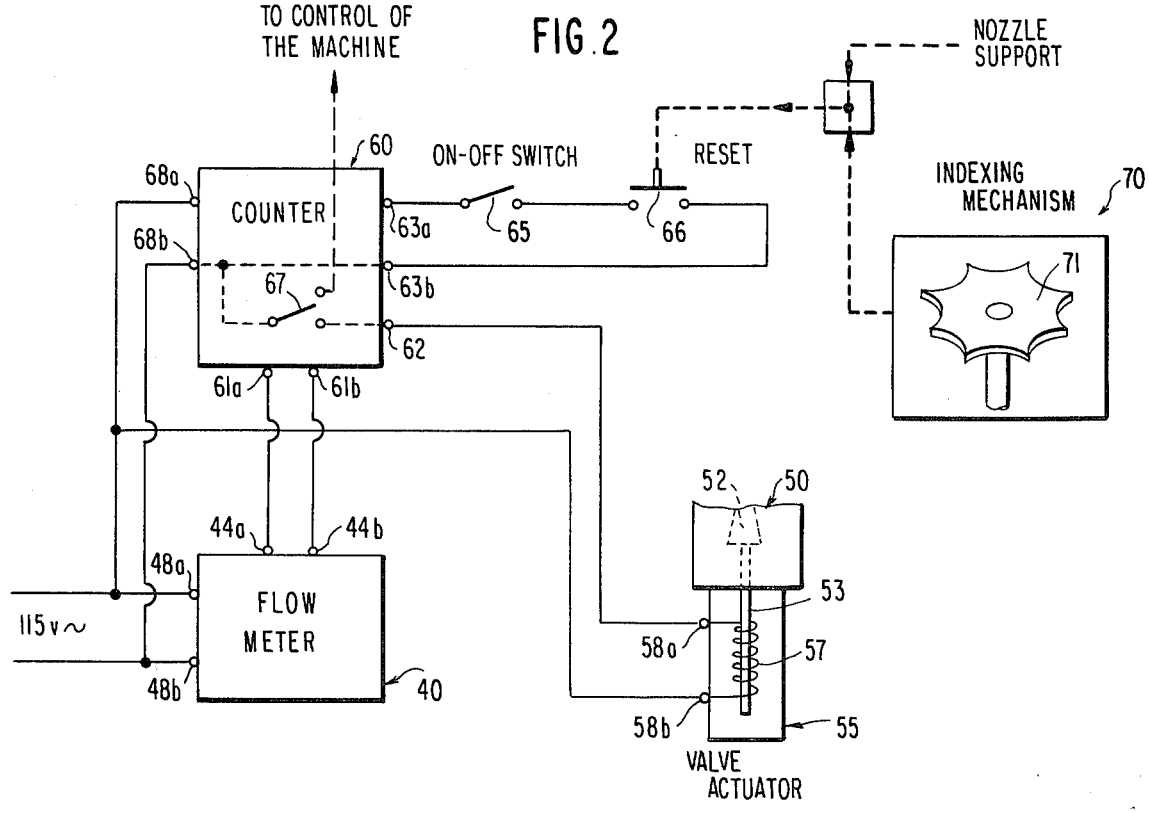

These and further objects, features and advantages of the present invention will become more apparent from the following description when taken in connection with the accompanying drawing which shows, for purposes of illustration only, one embodiment in accordance with the present invention, and wherein:

FIG. 1 is a schematic diagram showing a multi-nozzle filling machine in accordance with the present invention; and FIG. 2 is a schematic electric diagram for the parts of the filling machine in accordance with the present invention.

Referring now to the drawing wherein like reference numerals are used throughout the various views to designate like parts, reference numeral 10 generally designates a conveyor which normally travels in the direction of arrow 11 and carries thereon the containers 12, 12', 12" etc. to be filled. A nozzle generally designated by reference numeral 20, 20', 20", etc. which is of any known construction, is supported on a nozzle support 21, again of conventional construction, which is adapted to reciprocate in the up-and-down direction as indicated schematically by arrow 22. A reservoir 30 for the liquid product to be dispensed which may be under some pressure as indicated by arrows P is connected by way of a line section 31 with a liquid-flow meter generally designated by reference numeral 40. Line section 32 connects the output of flow meter 40 with the input of a valve generally designated by reference numeral 50 which may be of any conventional construction. In a particularly simple embodiment of the present invention, valve 50 is a conventional pinch valve having a fixed abutment 51 and movable pinching actuator 52 whose actuating piston rod 53 is adapted to be selectively reciprocated in the direction represented schematically by double arrow 54 by means of a conventional valve actuator generally designed by reference numeral 55 which may be a hydraulic, pneumatic or electric valve actuator. Since the control system is electrical, a solenoid valve actuator 55 is preferred for sake of simplicity. Line section 33 then connects the output of the valve 50 with the respective nozzle 20.

The output 44 of the liquid-flow meter 40 which consists of signals in the form of pulses is connected with the input 61 of a counter generally designated by reference numeral 60 which may be of any conventional construction. The circuits of this counter are such that it will count up until a predetermined number of pulses indicative of a predetermined amount of liquid product flowing through the flow meter 40 have been received at its input 61. Once the predetermined number of pulses for which the counter has been programmed has been reached, it will close a circuit, schematically indicated in FIG. 2 by relay 67, causing an electrical voltage to appear at its output 62 which, in turn, will cause the valve actuator 55 to close the valve 50. In the illustrated embodiment of FIG. 2, closure of relay 67 will apply voltage from one side of the power supply by way of terminal 68b to terminal 62 of counter 60 which is connected with terminal 58a of valve actuator 55 so that the solenoid 57 in valve actuator 55 is energized, the other side of solenoid 57 being connected by way of the other terminal 58b with the other side of the power supply voltage. To actuate the reset of counter 60, an indexing mechanism generally designated by reference numeral 70 is provided which may be in the form of a star wheel 71 having, for instance, a number of prongs corresponding to the number of containers to be filled simultaneously. Since the details of such star-wheel mechanism are described more fully in U.S. Pat. No. 4,083,389, and the copending application Ser. No. 119,317, entitled "Control System for Filling Machine" and filed in the U.S. Patent and Trademark Office on Feb. 7, 1980, now U.S. Pat. No. 4,294,294, a detailed description thereof is dispensed with herein. Suffice it to point out that the reset circuit connected to terminals 63a and 63b of counter 60 includes, in addition to an on-off switch generally designated by reference numeral 65 which may be a conventional toggle switch, a reset switch 66 only schematically indicated in FIGS. 1 and 2, which is closed in a conventional manner when the indexing mechanism 70 has carried out the prescribed functions, in case of a star-wheel 71, the predetermined angular movement, as described in the aforementioned U.S. patent application.

OPERATION

The operation of the filling machine in accordance with the present invention is believed apparent. Upon closing of the on-off switch 65 with the reset 66 closed, counter 60 will cause the valve actuator 55 to open the valve 50 which, in turn, will permit fluid product to flow from reservoir 30 by way of line section 31, flow meter 40, line section 32, valve 50 and line section 33 to nozzle 20 which had been lowered beforehand into the container to be filled by the cyclic control mechanism of the machine which is of otherwise conventional, known construction. As the fluid product to be filled into the container 12 flows through the meter 40, the latter will produce electric pulses accurately reflecting the amount flowing through the meter. Counter 60 will count up these electric pulses and upon reaching a predetermined programmed number, will cause valve actuator 55 to close valve 50, thereby stopping the flow of fluid product through the meter 40. Once valve 50 is closed, the control mechanism of the machine will then cause the nozzle 20 to be raised out of the container 12 whereupon the star wheel indexing mechanism 71 is released to permit the filled container to be moved out of the filling position by the continuously moving conveyor 11, causing the star wheel 71 to be driven at the same time by the moving containers. As soon as the last filled container has passed the filling station and a new bath of empty containers has arrived at the filling station, the indexing mechanism 70 actuated by the container-driven star wheel 71 will again cause the lowering mechanism to lower the nozzle support 21 and therewith the nozzles 20 into the containers 12, 12', 12", etc. and thereupon actuate the reset switch 66 which, in turn, will cause the counter 60 to be reset, which, in turn, causes opening of the switch 67 which results in de-energizing solenoid 57, thereby opening valve 50. As a result thereof, fluid product will start to flow again through the flow meter 40 and by way of line sections 31, 32 and 33 into the nozzle 20 which, in the meantime, had been lowered into the corresponding container 12. As soon as the predetermined number of electric pulses have again been counted in the counter 60, the counter will again close the relay switch 67, thereby energizing solenoid 57 of valve actuator 55 which, in turn, will cause valve 50 to be closed.

Since the various controls for raising and lowering the nozzles and for interrelating the same to the cyclic operation of the machine are known as such in the art, a detailed description thereof is dispensed with herein.

While a filling machine with a single nozzle has been described so far, it is, of course, understood that the present invention is not limited thereto but can be used also with multi-nozzle filling machines. In FIG. 1, three nozzles 20, 20' and 20" of, for example, an eight-nozzle filling machine have been shown for cooperation with the containers 12, 12' and 12". If the machine is to fill simultaneously eight containers, the star wheel 71 may have eight prongs so as to make one complete revolution during each filling cycle. In case of an eight-nozzle filling machine, eight flow meters 40 eight counters 60 and eight pinch valves 50 would be provided with each nozzle connected individually with the tank 30 by way of a feed circuit including a meter 40 and a valve 50. If, however, utmost accuracy is not necessary, it would suffice to utilize only a single flow meter 40 in a typical line 31, 32, 33 to provide input signals to a single counter 60 which then would actuate all the valve actuators 55. By providing identical nozzles and identical pressure losses in the feed lines to the nozzles, such a system might be sufficiently accurate for certain purposes.

The present invention, of course, is also applicable to dual or multi-lane filling machines, as more fully designated in the U.S. Pat. No. 4,073,322. The transverse reciprocating motion of the nozzle support 21 is thereby indicated by double arrow 25, the second filling lane being generally designated in FIG. 1 herein by reference numeral 10'. Moreover, an additional indexing mechanism, for example, again in the form of a star-wheel (not shown) may also be provided in a filling machine according to the present invention, particularly in a multi-nozzle filling machine, located at the entrance to the filling station to sense the presence of the required number of empty containers before the cyclic operation is permitted to continue. Since the cyclic control of filling machines of the type to which the present invention relates are known as such, as described in the aforementioned patents and patent application as well as, for example, in U.S. Pat. Nos. 3,067,786; 3,237,661 and 4,004,620, a detailed description thereof is dispensed with herein for the sake of simplicity. Suffice it to say that the cyclic control can be obtained by the use of a conventional electric, pneumatic, hydraulic or mixed control system as described in the aforementioned patents.

The filling machine of the present invention could also be used with another dual lane nozzle configuration such as where two sets of nozzles are employed, one over each conveyor 10 and 10' with the nozzles remaining transversely fixed in position instead of reciprocating as indicated by double arrow 25. In this arrangement liquid is supplied to the respective sets of nozzles from respective branches of tubing in the form of a "Y" connection from the liquid flow meter. Alternating pinch clamps would direct the flow from one set of nozzles to the other.

The simplified diagram of FIG. 1 is shown in greater detail in FIG. 2 in which the corresponding terminals are designated by the same reference numerals with the suffixes a and b.

While we have shown and described only one embodiment in accordance with the present invention, it is understood that the same is not limited thereto but is susceptible of numerous changes and modifications as known to those skilled in the art. For example, in lieu of the counter, any known microprocessor may be used which is capable of handling the information from a number of channels, each equipped with a flow meter as corresponds to the number of nozzles in the machine. The microprocessor may thereby separately actuate the valve actuator for each channel in accordance with the number of pulses received from the corresponding flow meter. The filling machine can also be one which is semiautomatically or manually operated instead of automatic. For example, containers could be manually positioned for filling with the reset switch being actuated either by the positioning of the containers to be filled or by a manually operated foot pedal.

Consequently, we do not wish to be limited to the details shown and described herein, but intend to cover all such changes and modifications as are encompassed by the scope of the appended claims.

We claim:

1. A filling machine for filling container means with an accurately predetermined amount of liquid product, comprising nozzle means, feed means for feeding fluid product to said nozzle means including measuring means for accurately measuring the liquid-flow rate of the liquid product and operable to produce in its output signals indicative of the liquid-flow rate, valve means in said feed means downstream of said measuring means for selectively interrupting the feed of the liquid product to said nozzle means, valve actuating means for selectively opening and closing said valve means, means responsive to signals of said measuring means, which are indicative of the amount of liquid product passing therethrough, and operatively connected with its input to the output of said measuring means and with its output to said valve actuating means so as to close said valve means upon receipt in its input of a predetermined number of signals representative of the predetermined amount of liquid product to be filled into a given container means to thereby interrupt the feed of the liquid product, said means responsive to the signal including reset means operable upon actuation thereof to cause reopening of said valve means by said valve actuating means so as to start another filling operation, and further means for automatically actuating said reset means in response to a signal from the filling machine indicating its readiness for the next filling operation.

2. A filling machine according to claim 1, wherein said means responsive to signals is a counter means.

3. A filling machine having a cyclic filling operation according to claim 2, characterized in that said filling machine includes means for lowering the nozzle means into the container means before actuating the reset means causing opening of the valve means and for actuating the counter means causing closing of the valve means before raising the nozzle means out of the container means.

4. A filling machine according to claim 3, characterized in that the filling machine includes a number of nozzle means for simultaneously filling a corresponding number of container means, said number of nozzle means being operable to be lowered and raised in unison and each being provided with its own valve and valve actuating means selectively operated by the counter means.

5. A filling machine according to claim 4, characterized in that a separate measuring means is provided in the feed means to each nozzle means.

6. A filling machine according to claim 5, characterized in that a separate counter means is provided for each measuring means.

7. A filling machine according to claim 4, characterized in that the feed means includes a common reservoir operatively connected with the nozzle means by way of feed lines each individually controlled by a separate valve means having an individual valve actuating means, all valve actuating means being controlled by a common control means.

8. A filling machine according to claim 7, characterized in that the flow characteristics of all feed lines and nozzle means are identical, and in that a measuring means is arranged in only one of said feed lines.

9. A filling machine according to claim 1, 2, 3, or 4 characterized in that the further means includes indexing means for sensing the departure of the filled container means and the arrival of a corresponding number of empty container means.

10. A filling machine according to claim 9, characterized in that the indexing means includes at least one container-driven star-wheel means.

11. A filling machine with two substantially parallel filling lanes according to claim 10, characterized in that the filling machine includes means for reciprocating the nozzle means alternately over one and then the other filling lane to cyclically fill the container means in one lane and thereafter the container means in the other lane, only one measuring means being provided operable to handle the measuring function for both lanes.

12. A filling machine according to claim 2, wherein said reset means is operable to reset said counter means after its stoppage as a result of closure of said valve means.

13. A filling machine according to claim 12, wherein actuation of said reset means by said further means is operable to cause said valve actuating means to open said valve means.

14. A filling machine according to claim 13, wherein said further means includes indexing means for indicating when a predetermined number of filled container means has left the filling position and a corresponding number of empty container means has arrived thereat.

* * * * *